US007341072B2

(12) United States Patent
Talty

(10) Patent No.: US 7,341,072 B2
(45) Date of Patent: Mar. 11, 2008

(54) OXYGEN SUPPLY SYSTEM HAVING A CENTRAL FLOW CONTROL UNIT

(75) Inventor: James Talty, Orchard Park, NY (US)

(73) Assignee: Carleton Technologies, Inc., Orchard Park, NY (US)

( * ) Notice: Subject to any disclaimer, the term of this patent is extended or adjusted under 35 U.S.C. 154(b) by 724 days.

(21) Appl. No.: 10/428,640

(22) Filed: May 2, 2003

(65) Prior Publication Data

US 2004/0216742 A1 Nov. 4, 2004

(51) Int. Cl.
*F16K 17/36* (2006.01)

(52) U.S. Cl. ...................................... 137/81.1; 137/467

(58) Field of Classification Search ............... 137/81.1, 137/467; 244/118.5, 194
See application file for complete search history.

(56) References Cited

U.S. PATENT DOCUMENTS

| | | | | |
|---|---|---|---|---|
| 2,308,124 | A * | 1/1943 | Stettner | 137/81.1 |
| 2,384,669 | A * | 9/1945 | Fields | 137/81.1 |
| 3,698,412 | A * | 10/1972 | Smyly | 137/81.1 |
| 3,960,358 | A | 6/1976 | Vollmer et al. | 251/61.5 |
| 3,981,300 | A | 9/1976 | Williams | 128/142 R |
| 4,226,259 | A | 10/1980 | Szekely et al. | 137/269 |
| 4,282,710 | A | 8/1981 | Avant | 60/39.28 R |
| 4,336,590 | A | 6/1982 | Jacq et al. | 364/418 |
| 4,406,400 | A | 9/1983 | Berkhof | 236/80 F |
| 4,445,532 | A | 5/1984 | Mitchell | 137/495 |
| 4,499,914 | A * | 2/1985 | Schebler | 137/81.1 |
| 4,506,690 | A | 3/1985 | Mitchell | 137/1 |
| 4,567,909 | A * | 2/1986 | Schebler et al. | 137/81.1 |
| 4,634,047 | A | 1/1987 | Dean | 236/49 |
| 4,648,397 | A * | 3/1987 | Beale | 128/205.11 |
| 4,651,728 | A | 3/1987 | Gupta et al. | 128/201.28 |
| 4,829,196 | A | 5/1989 | Bronicki et al. | 290/54 |
| 4,858,606 | A * | 8/1989 | Hamlin | 128/204.29 |
| 5,127,436 | A | 7/1992 | Campion et al. | 137/614.11 |
| 5,199,423 | A | 4/1993 | Harral et al. | 128/202.26 |
| 5,513,673 | A | 5/1996 | Slavin et al. | 137/625.65 |
| 5,709,204 | A | 1/1998 | Lester | 128/205.25 |
| 5,762,102 | A | 6/1998 | Rimboym | 137/492.5 |

(Continued)

*Primary Examiner*—Ramesh Kirshnamurthy
*Assistant Examiner*—Craig Schneider
(74) *Attorney, Agent, or Firm*—Jaeckle Fleischmann & Mugel, LLP

(57) ABSTRACT

The present invention is a centralized flow control unit (CFCU) for regulating oxygen flow in a multiple user emergency oxygen distribution system in passenger aircraft. Upon activation, the CFCU initially allows unregulated flow of oxygen to surge into the distribution system to thereby purge the ambient air out of the system. After a sufficient pressure is achieved in the distribution system, the CFCU regulates the flow mechanically with a diaphragm engaging a regulator valve. The pressure of the oxygen under the diaphragm causes the regulator valve to reduce the flow of the oxygen through the CFCU. The CFCU accounts for changes in altitude by including a bleed passageway in the diaphragm. A small amount of the oxygen under the diaphragm bleeds to the chamber above the diaphragm then a bleed exit allows the oxygen to escape to the ambient air. An aneroid valve in fluid communication with the bleed exit linearly adjusts the amount of oxygen allowed to exit through the bleed exit such that less oxygen is allowed to escape for an increase in altitude. Thus the pressure above the diaphragm increases to thereby allow more oxygen to flow through the regulator valve.

8 Claims, 6 Drawing Sheets

U.S. PATENT DOCUMENTS 5,809,999 A 9/1998 Lang .................... 128/200.24
5,988,204 A 11/1999 Reinhardt et al. .......... 137/271
6,003,543 A 12/1999 Sulatisky et al. ........ 137/487.5
6,110,427 A 8/2000 Uffenheimer ................ 422/81
6,244,540 B1 6/2001 Stabile et al. ............ 244/118.5

* cited by examiner

OXYGEN SUPPLY SYSTEM HAVING A CENTRAL FLOW CONTROL UNIT

FIELD OF INVENTION

This application relates to oxygen flow control systems for emergency oxygen supply systems in passenger aircraft.

BACKGROUND

Emergency oxygen supply systems for passenger aircraft are well known and characterized by being able to provide to each passenger a supply of oxygen in the case of an emergency. These systems are designed to be used during cabin depressurization and thus are intended to supply each passenger with a sufficient oxygen flow to meet the physiological requirements for high-altitude survival.

In the past the main emphasis in development has been directed towards improved breathing apparatus, improved oxygen generation, or accurate delivery of oxygen to meet physiological requirements.

U.S. Pat. No. 6,244,540 issued to Stabile teaches a method for calculating the oxygen required after emergency cabin decompression, but is a relatively complex system that provides constant monitoring of altitude.

U.S. Pat. No. 5,709,204 issued to Lester discloses a specially designed escape mask, but does not recognize the problem of cabin depressurization and the need to charge the system quickly with oxygen using a pneumatic control system.

U.S. Pat. No. 5,809,999 issued to Lang teaches an emergency oxygen supply system of an aircraft equipped with a pressurized cabin, breathable gas is supplied by a gas generator (1) for generating an oxygen-enriched gas either from the ambient air, or from air tapped from the engine whereby passengers receive mixed gas having an adequate oxygen content. This system is complex and requires power during operation.

Therefore, what is needed in the art is an emergency oxygen supply system that is simple and responds to changes in altitude without external monitoring.

Further what is needed in the art is an emergency oxygen supply system that recognizes cabin depressurization and quickly charges the system with oxygen.

Even further what is needed in the art is an emergency oxygen supply system that doesn't require power to regulate oxygen flow after activation.

SUMMARY OF INVENTION

A central control valve unit is provided for a multiple passenger emergency oxygen system that is pneumatically controlled and provides oxygen to the passengers and crew as a function of altitude. In the event of an emergency de-pressurization of the passenger cabin an emergency oxygen supply will be activated that provides each passenger with a source of oxygen. The amount of oxygen that a passenger requires in order to remain conscious depends upon and is inversely related to the altitude of the plane. At high altitudes the passenger will require more oxygen to compensate for the lower level of oxygen available in the cabin. In order to provide the oxygen quickly, the distribution lines running to the passengers must be purged of the ambient air (that contains only the normal amount of oxygen) and replaced with pure oxygen. After the system has been purged the lines are then supplied with the altitude dependent supply of oxygen.

The central flow control valve system (CFCV) is operated by pneumatic means after it is activated to simplify the system and reduce the amount of electrical power required to operate. After activation, the system locks mechanically in operating mode until the system is reset, thus insuring operation throughout the emergency without need to draw further electrical power. The CFCV provides a simple subsystem that automatically charges the distribution lines with oxygen, and then operates without further electrical power requirements to supply the human physiological oxygen requirement at effective altitude. This supply requirement is achieved in a two phase system; increased oxygen supply from 10,000 to 15,000 feet, and a more rapidly increasing oxygen/altitude supply rate increase at above about 15,000 feet.

BRIEF DESCRIPTION OF FIGURES

The above-mentioned and other features and advantages of this invention, and the manner of attaining them, will become appreciated and be more readily understood by reference to the following detailed description of one embodiment of the invention in conjunction with the accompanying drawings, wherein.

Corresponding reference characters indicate corresponding parts throughout the several views. The exemplifications set out herein illustrate the preferred embodiments of the invention and such exemplifications are not to be construed as limiting the scope of the invention in any manner.

DETAILED DESCRIPTION

Figure 1:
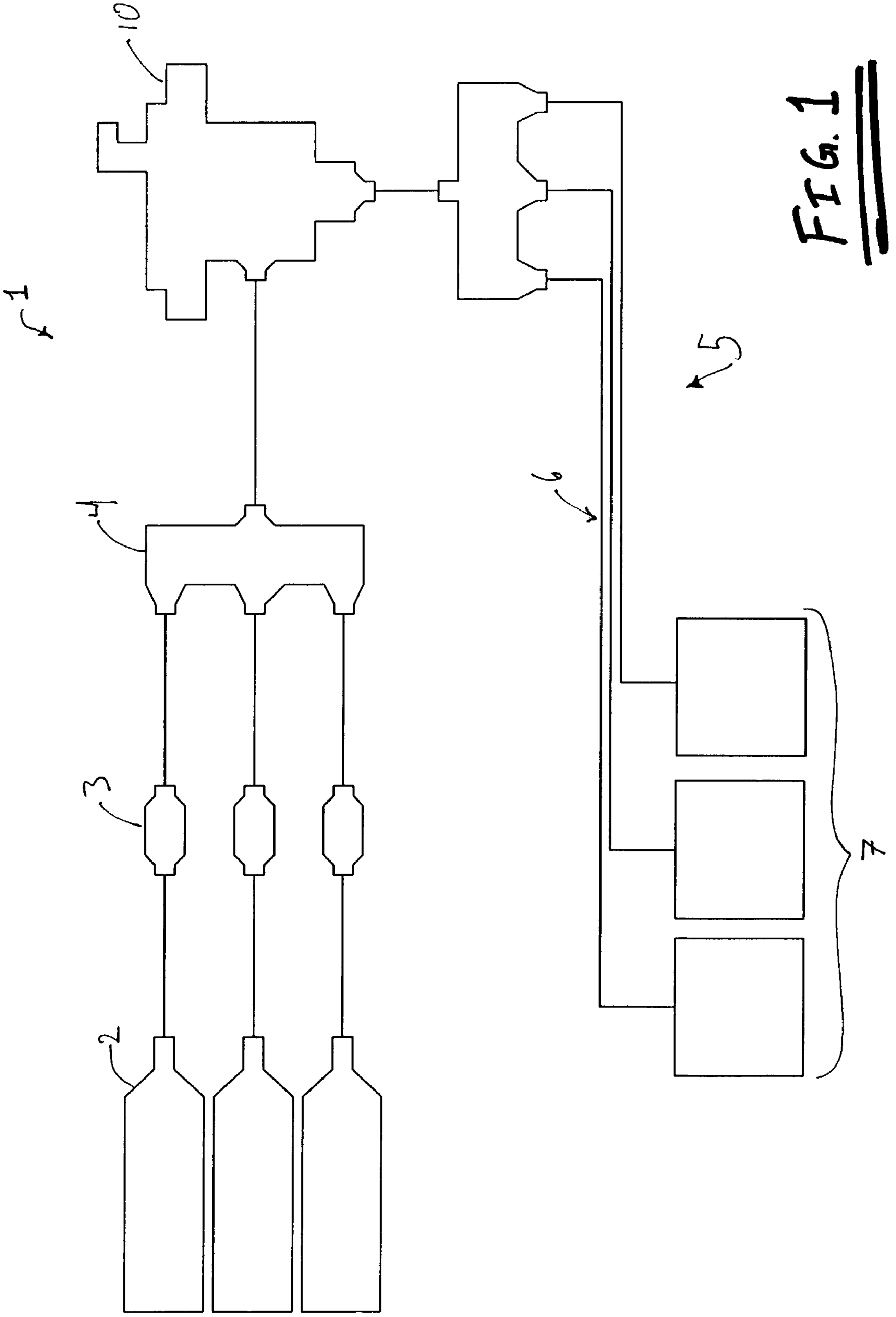
FIG. 1 is a schematic of one embodiment of the emergency oxygen supply system having a central control valve.

Referring now to FIG. 1, an emergency oxygen supply system (1) for a passenger aircraft has an oxygen supply, usually in the form of multiple bottles (2) of highly pressurized oxygen that are stepped down to through regulators (3) to pressures of 115-125 pounds per square inch. Oxygen is then fed through a manifold (4) to a central flow control valve (10) that controls the charging and supply of the distribution system (5) of oxygen to passengers. The distribution system has multiple lines (6) that provide emergency oxygen to multiple individual user stations (7). These user stations typically are drop down masks that are deployed in the case of emergency and can be used by each individual passenger.

The CFCV (10) is kept inactive until activated by either a person or an automatic sensor. Then the CFCV (10) operates to provide a full pressure purge of the distribution lines (6) in order to replace the ambient air with oxygen. Typically the purge is done by allowing relatively unrestricted flow of the oxygen through the CFCV (10) from the source manifold for a period of about 5 seconds (although the amount of time will depend upon the volume of the distribution system). This surge of pressure also serves to unlatch the mask container doors in the multiple individual user stations (7).

Figure 2:
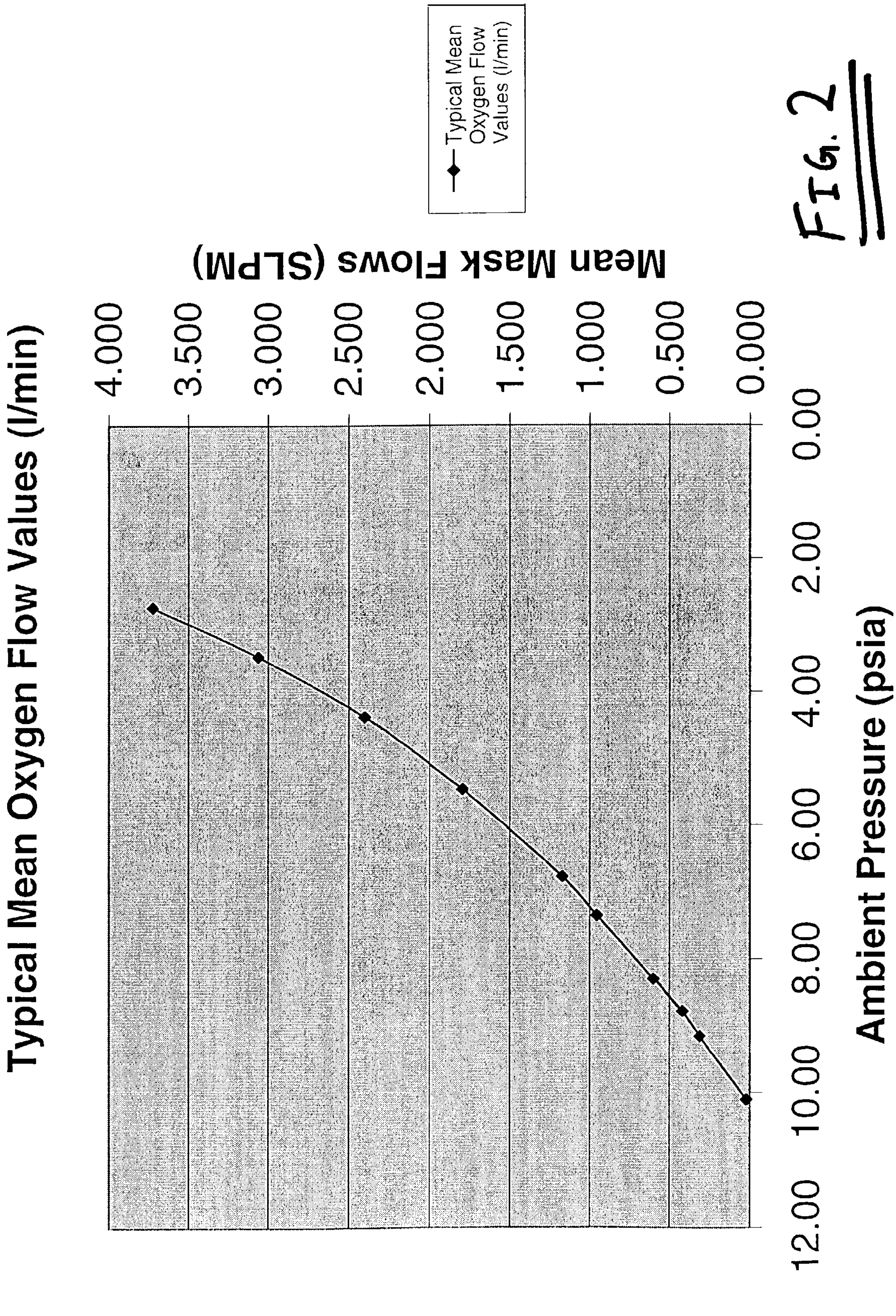
FIG. 2 is a schematic of the physiological oxygen requirement as a function of altitude.
Figure 4:
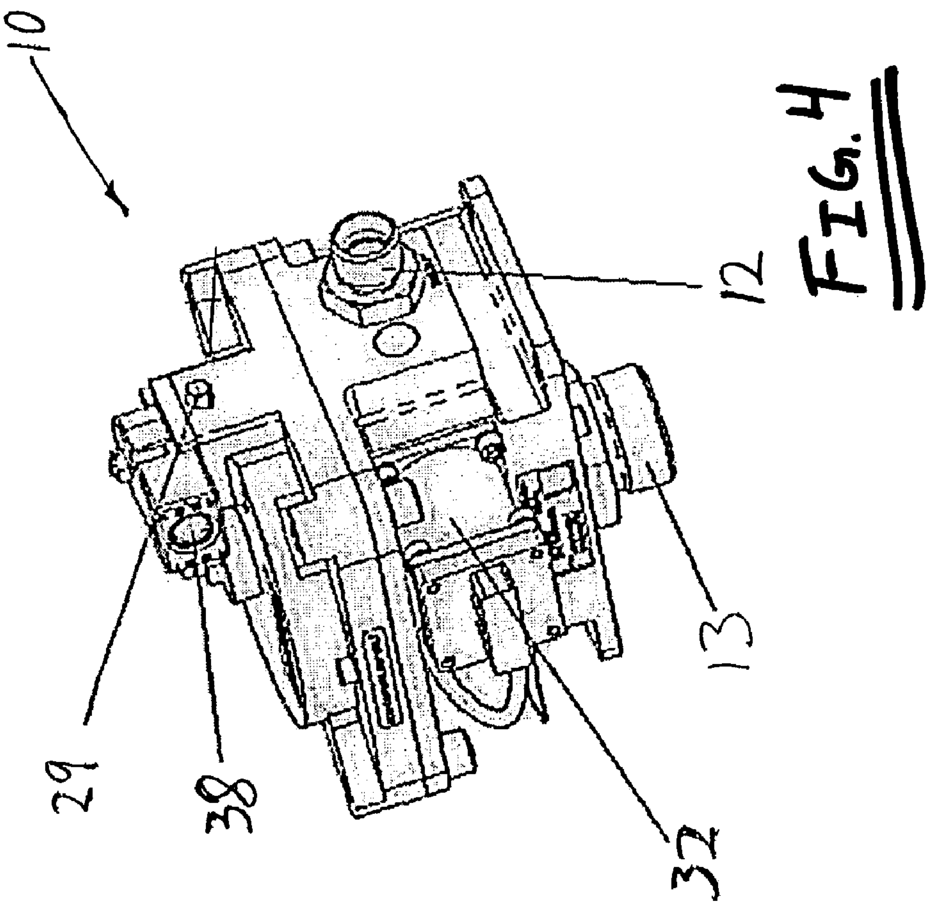
FIG. 4 is a perspective view of one embodiment of the central control valve specifically showing the inlet and outlet ports.
Figure 3:
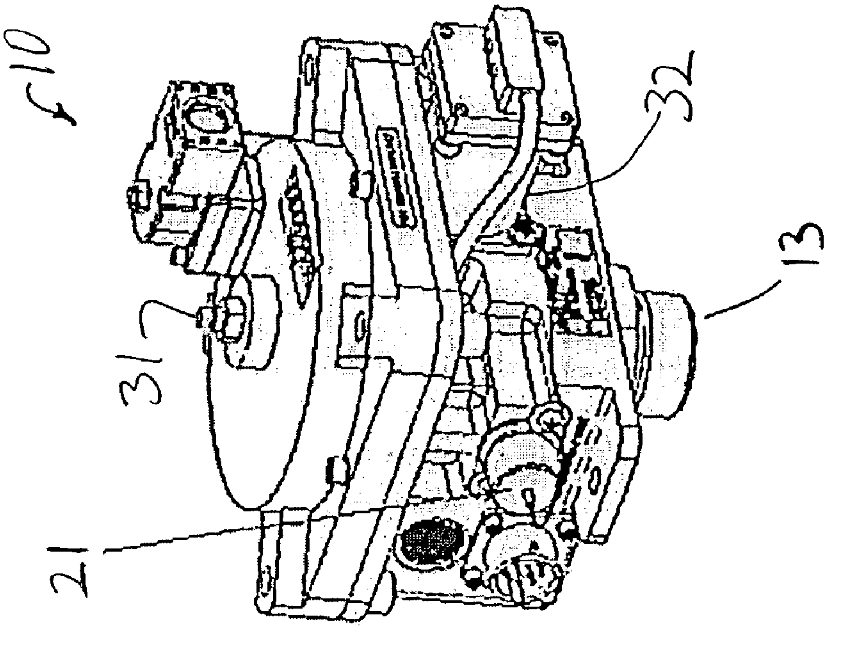
FIG. 3 is a perspective view of one embodiment of the central control valve showing the surge port control plug.
Figure 5:
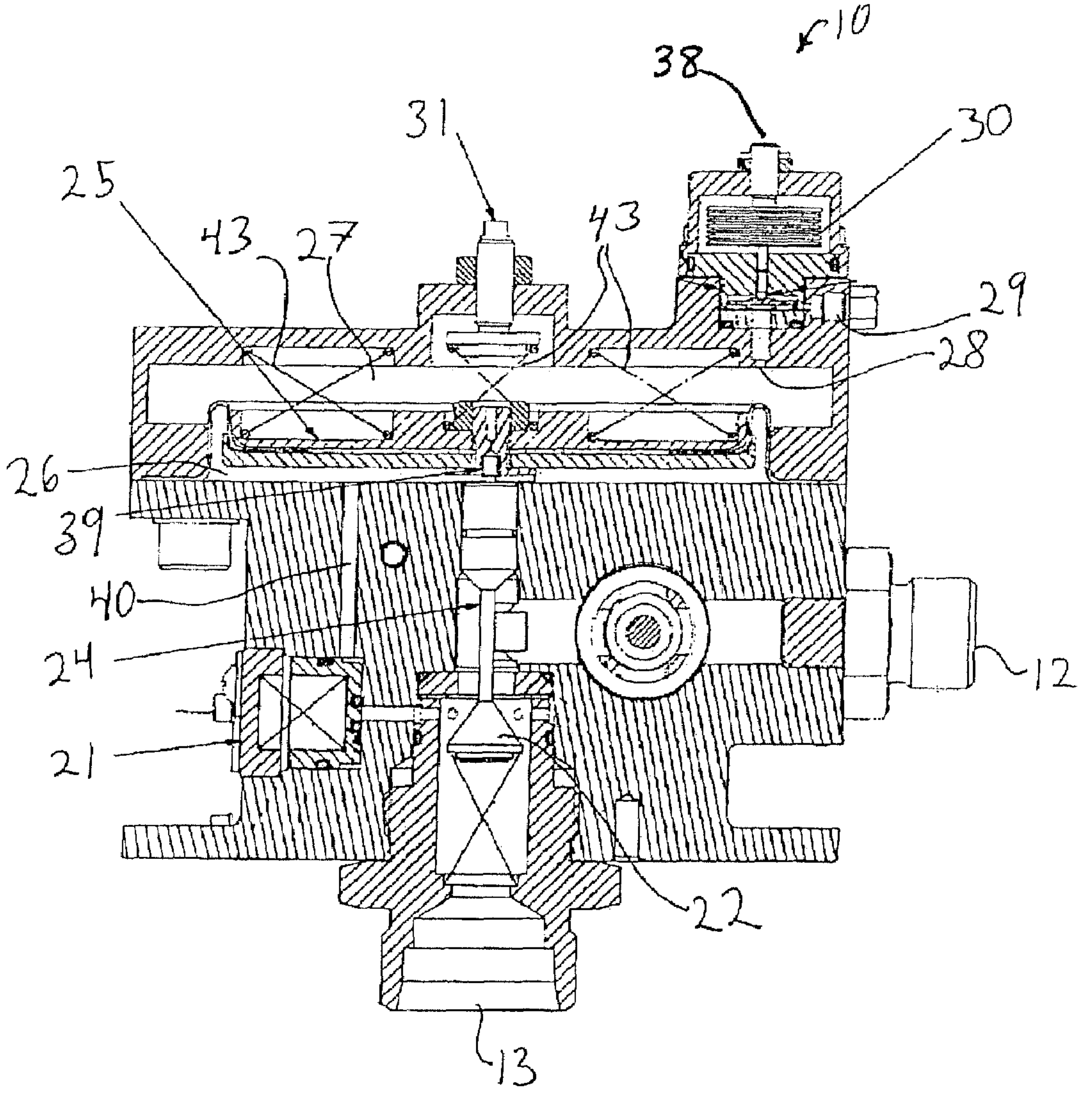
FIG. 5 is a cross sectional view of the inner workings including the surge control mechanism of the central control valve in one embodiment.

After purging the system the CFCV (10) then regulates the oxygen flow as a function of pressure within the passenger cabin. If de-pressurization has occurred due to a compromise of the pressure cabin integrity, the CFCV (10) will adjust the pressure of the oxygen supply to exceed the minimum physiological requirement for the altitude equivalent of the prevailing cabin pressure. In general, the physiological oxygen requirement follows the curve shown in FIG. 2 and is approximately linear above 15,000 ft (atmospheric pressure is about 8.3 psia at 15,000 ft). The CFCV (10) then increases flow to provide a greater supply of oxygen to the passenger mask as altitude increases. Referring now to FIG. 5, this flow rate is controlled pneumatically, rather than by electronic means, by use of a spring loaded diaphragm assembly (25) that regulates a pressure regulating valve (22) disposed in the outlet air passage (13), spring-loaded in an open position. This pressure regulating valve (22) is axially disposed relative to a valve seat so that it can be moved to control the flow rate out the outlet passage.

A small orifice (39) in the central axis of the diaphragm (25) communicates between a first pressure chamber (26) and said second pressure chamber (27) and as time passes the pressure between the chambers equalizes. At relatively low altitudes the altitude aneroid (30) opens the bleed valve (29) of the second chamber (27), and the diaphragm (25) reacts to lower the outlet pressure. At higher altitudes the altitude aneroid (30) expands and closes the bleed valve (29) and the diaphragm (25) maintains the regulating valve (22) in a relatively more open position allowing greater oxygen pressures and flows.

Of course, the system operates in such a fashion that the system is not completely open or closed in operation and meets or exceeds the physiologically required oxygen flow at the particular pressure of the cabin. This regulation is continuous and after activation operates pneumatically.

Figure 6:
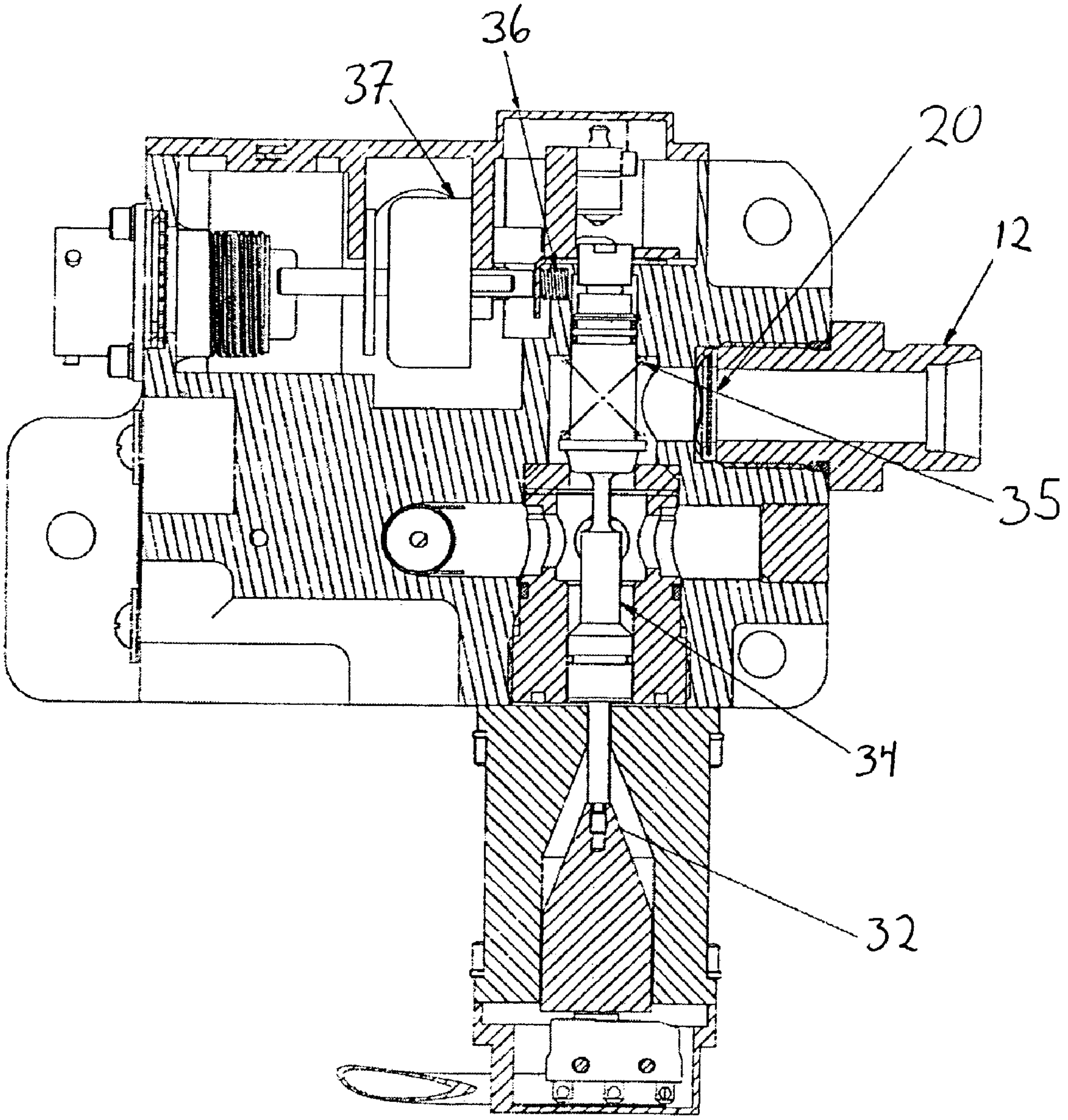
FIG. 6 is a cross sectional view of the central control valve 90 degrees from the vertical axis of FIG. 5 and specifically shows the operational lock mechanism.

Referring now to FIGS. 5 and 6, activation of the central flow control valve is accomplished electronically. An electronic activation signal causes the activation solenoid (32) to open the activation valve (34) against the spring (35) that normally holds it closed, opening the inlet passageway (12) and outlet passageway (13). In the preferred embodiment, the activation signal is a nominal 28 VDC for a maximum of 5 seconds. The oxygen source (2) then is free to flow through the inlet port (12) through to the outlet passageway (13), past the filter assembly (20), the oxygen pressure regulating valve (22), and the surge flow poppet valve (21) and exiting into the oxygen distribution system (5) via the outlet port (13). After flow activation a mechanical latch (36) engages the activation valve (34) and keeps the CFCV (10) in an open position and the solenoid (32) deactivates.

Resetting of the CFCV (10) is achieved when an electronic reset signal of 28 VDC in the preferred embodiment activates the reset solenoid (37). The activation of the reset solenoid disengages the mechanical latch (36) from the activation valve (34) to thereby allow the spring force to close the activation valve (34), thereby stopping the flow of oxygen between the manifold (4) and the oxygen distribution system (5). Further, the reduction in pressure within the CFCV (10) to ambient pressure allows a biasing spring to close the surge flow poppet valve (21). The reset solenoid (37) then deactivates and the CFCV (10) is ready to accept an activation signal.

The oxygen flow valve mechanism (22) has a valve stem and upper piston (24) that operates as disposed in a cylinder that communicates with the main pressure control diaphragm (25). The main pressure control diaphragm (25) is disposed in a chamber and sealably engages the chamber sidewall to create a first chamber (26) and second chamber (27). The first chamber is connected to small pressure sensing passage (40) via a pneumatically controlled surge mechanism (21) that when open allows the outlet passageway (13) pressure to be communicated to the first chamber (26). The second chamber (27) on the other side of the diaphragm (25) communicates with the high altitude bleed opening (28) that is controlled by a high altitude aneroid (30).

The surge time is controlled by the CFCV (10) by pneumatic means in that the size of the poppet (21) determines the time required to depress the poppet (21) and communicate exit port (13) pressure to the first pressure chamber (26) of the diaphragm mechanism. After activation, the full manifold (4) supply pressure enters the inlet port (12), past the opened activation valve (22) and into the outlet port (13), where this high pressure depresses the poppet valve (21) until it opens to the pressure sensing passage (40).

When opened after surge, the pressure sensing passageway (40) allows pressure buildup in the first chamber (26) that raises the spring loaded diaphragm (25) and the pressure regulating valve (22), which decreases flow and pressure. As pressure builds in the first chamber (26), gas is allowed to flow through the small orifice (39) that communicates to the second chamber (27). Additionally, flow is adjusted by operation of the altitude aneroid (30).

The design of the pressure control diaphragm (25) uses multiple springs (43) to provide greater accuracy, and also employs an additional fine adjustment screw (31). The multiple springs (43) are arranged radially around the central axis of the diaphragm (25) to provide stability, and also allows spring strength to be more accurately and precisely controlled than in the case of a larger single spring. In the preferred embodiment, the CFCV diaphragm (25) uses seven springs; six distributed radially, and one located along the central axis.

Referring to FIG. 5, the CFCV further includes a test port (38) for simulating the air pressure at different altitudes while the aircraft is on the ground. The test port (38) is in fluid communication with the altitude aneroid (30). To calibrate the CFCV (10), a vacuum source is connected to the test port (38), the activation solenoid (32) is activated, and the surge flow poppet valve (21) is opened such that the CFCV (10) is regulating the oxygen flow. The vacuum applied to the test port (38) is varied to simulate different altitudes while the outlet pressure is monitored. If the outlet pressure of the CFCV (10) is lower than what is physiologically required, the fine adjustment screw (31) is lowered such that the central axis spring exerts a greater force on the diaphragm assembly (25). This allows more oxygen through the oxygen pressure regulating valve (22) thereby increasing the outlet pressure for any given ambient air pressure. In the case that the outlet pressure of the CFCV (10) is significantly higher than what is physiologically required such that the oxygen supply (2) will be depleted too quickly, the fine adjustment screw (31) is raised such that the central axis spring exerts a smaller force on the diaphragm assembly (25). This allows less oxygen through the oxygen pressure regulating valve (22) thereby decreasing the outlet pressure for any given ambient air pressure.

Figure 7:
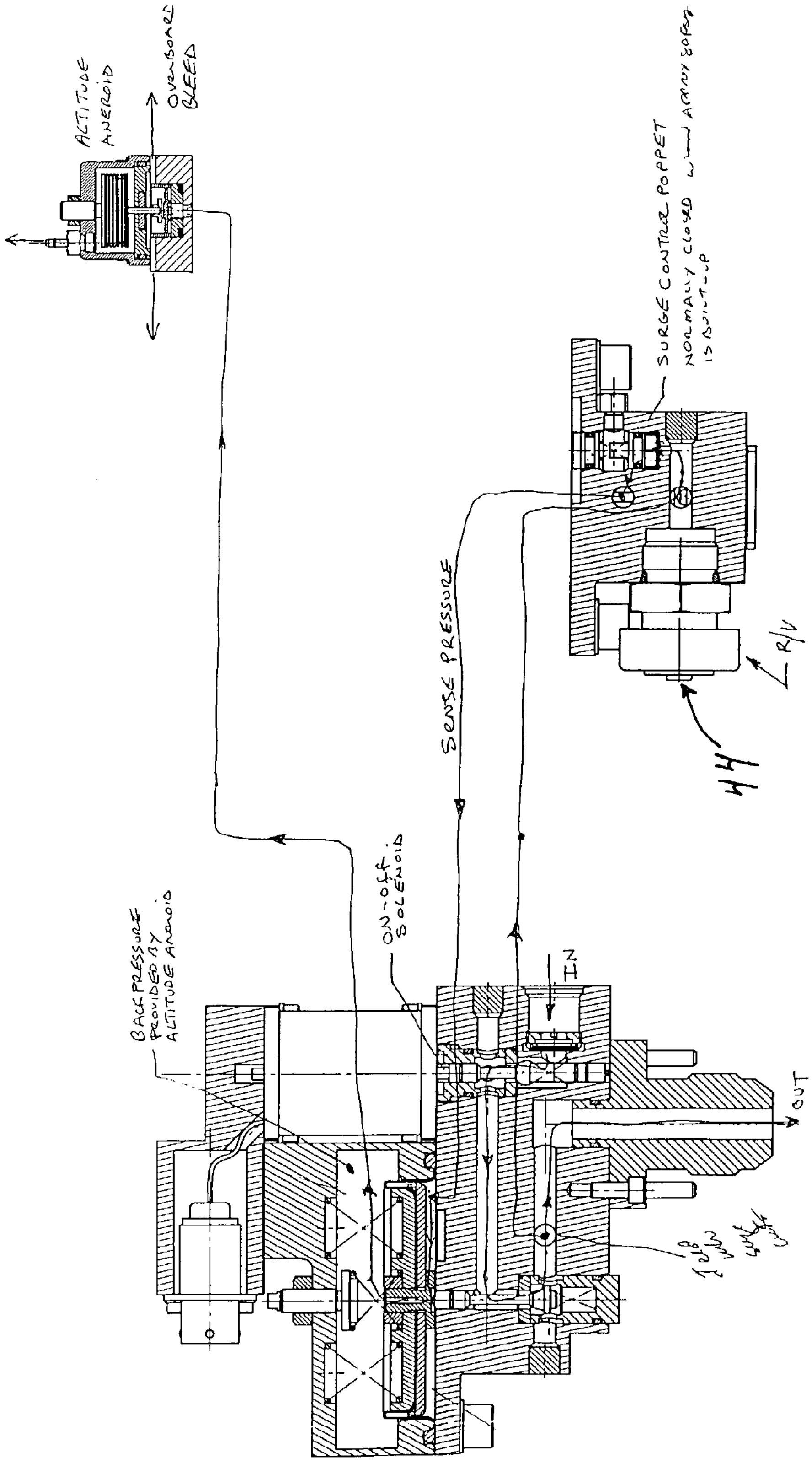
FIG. 7 is a schematic flow chart of the operation of the central control valve showing the surge mechanism in operation and the regulation of oxygen supply as a function of altitude.

FIG. 7 shows the flow of oxygen through a CFCV (10) having a slightly different configuration. As shown in FIG. 7, the CFCV (10) may also include a relief valve (44) in fluid communication with the pressure sensing passage (40). The relief valve (44) is configured to relieve the fluid pressure in the pressure sensing passage (40) in the case that the fluid pressure reaches a pressure that may damage components downstream of the outlet air passage (13).

DESCRIPTION AND REFERENCE NUMBER emergency oxygen supply system (1)
oxygen supply (2)
regulators (3)
manifold (4)
distribution system (5)
multiple lines (6)
individual user stations (7)
CFCV (10)
inlet air passage (12)
outlet air passage (13)
filter assembly (20)
surge flow poppet valve (21)
pressure regulating valve (22)
pressure regulating valve stem/upper piston (24)
diaphragm assembly (25)
first pressure chamber (26)
second pressure chamber (27)
high altitude bleed opening (28)
bleed valve (29)
altitude aneroid (30)
fine adjustment screw (31)
activation solenoid (32)
activation valve (34)
mechanical latch (36)
reset solenoid (37)
small orifice (in diaphragm) (39)
pressure sensing passage (40)
multiple springs (43)
relief valve (44)

What is claimed is:

1. A centralized flow control unit for oxygen flow regulation in a system that supplies emergency oxygen to passengers and cabin attendants in commercial airlines, comprising:

an oxygen inlet;

an actuation poppet assembly having an actuation inlet and an actuation outlet, the actuation inlet of said actuation poppet assembly being in fluid communication with said oxygen inlet;

a regulator poppet assembly having a regulator inlet and a regulator outlet, said regulator inlet being in fluid communication with said actuation outlet, said regulator poppet assembly including a regulator valve seat and a regulator valve that has a diaphragm side and an outlet side, said outlet side engaging a regulator spring configured to bias said outlet side in the direction of said regulator valve seat;

an oxygen outlet in fluid communication with said regulator outlet, said oxygen outlet having an oxygen outlet pressure; and means for biasing said regulator poppet assembly toward the open state with a force that is a function of the oxygen outlet pressure and the ambient air pressure, said means for biasing said regulator poppet assembly comprising a diaphragm configured to bias said regulator poppet assembly in the open position, said diaphragm having a regulator side that engages said regulator valve and a spring loaded side that includes a plurality of diaphragm springs, said means for biasing said regulator poppet assembly further comprising a feedback passage in fluid communication with said oxygen outlet and the regulator side of said diaphragm, said feedback passage including a spring loaded surge piston configured to prevent fluid communication between said feedback passage and the regulator side of said diaphragm until a predetermined pressure is reached in said oxygen outlet, after which, the spring loaded surge piston permits fluid communication between said oxygen outlet and the regulator side of said diaphragm for substantially any pressure to thereby decrease the force of said diaphragm opposing the biasing force of the regulator spring on said regulator poppet assembly with an increase in oxygen outlet pressure.

2. The centralized flow control unit according to claim 1, wherein said means for biasing said regulator poppet assembly further comprises a bleed passage permitting limited fluid communication between the regulator side and the spring loaded side of said diaphragm.

3. The centralized flow control unit according to claim 2, wherein said means for biasing said regulator poppet assembly further comprises a bleed exit in fluid communication with the spring loaded side of said diaphragm.

4. The centralized flow control unit according to claim 3, wherein said means for biasing said regulator poppet assembly further comprises an aneroid valve in fluid communication with said bleed exit, said aneroid valve being configured to linearly decrease bleed flow to said bleed exit with decreasing ambient pressure to thereby cause a increase in pressure on the spring loaded side of said diaphragm, thus increasing the force of said diaphragm on said regulator poppet assembly with a decrease in ambient pressure.

5. The centralized flow control unit according to claim 4, wherein said means for biasing said regulator poppet assembly further comprises a test port in fluid communication with said aneroid valve, said test port configured for attachment to a vacuum source to thereby allow simulation of high altitude conditions for the purpose of calibrating said means for biasing said regulator poppet assembly.

6. The centralized flow control unit according to claim 1, wherein said means for biasing said regulator poppet assembly further comprises a relief valve in fluid communication with said feedback passage, said relief valve being configured to permit fluid communication between said feedback passage and the ambient air to prevent the air pressure in said feedback passage and thus the oxygen outlet pressure from exceeding a predetermined maximum pressure thereby protecting any components downstream of said oxygen outlet.

7. The centralized flow control unit according to claim 1, wherein the plurality of diaphragm springs include at least one spring engaging a calibration screw that is configured for adjusting the spring force on said diaphragm.

8. The centralized flow control unit according to claim 1, wherein said oxygen outlet is configured for connection to an oxygen distribution system.

* * * * *